(12) United States Patent
Wennerström (10) Patent No.: US 12,246,971 B2
(45) Date of Patent: Mar. 11, 2025

(54) MULTIPASS WATER FILTER

(71) Applicant: Bluewater Innovations AB, Stockholm (SE)

(72) Inventor: Johan Wennerström, Sollentuna (SE)

(73) Assignee: Bluewater Innovations AB, Stockholm (SE)

( * ) Notice: Subject to any disclaimer, the term of this patent is extended or adjusted under 35 U.S.C. 154(b) by 461 days.

(21) Appl. No.: 17/858,291

(22) Filed: Jul. 6, 2022

(65) Prior Publication Data

US 2023/0012214 A1    Jan. 12, 2023

(30) Foreign Application Priority Data

Jul. 6, 2021   (SE) .................................... 2150890-8

(51) Int. Cl.
| | |
|---|---|
| C02F 1/00 | (2023.01) |
| B01D 29/35 | (2006.01) |
| B01D 35/153 | (2006.01) |
| B01D 35/26 | (2006.01) |
| C02F 1/32 | (2023.01) |

(52) U.S. Cl.
CPC .............. *C02F 1/003* (2013.01); *B01D 29/35* (2013.01); *B01D 35/153* (2013.01); *B01D 35/26* (2013.01); *C02F 1/325* (2013.01); *C02F 2201/002* (2013.01); *C02F 2301/046* (2013.01); *C02F 2303/04* (2013.01); *C02F 2307/04* (2013.01)

(58) Field of Classification Search
None
See application file for complete search history.

(56) References Cited

U.S. PATENT DOCUMENTS

| | | | | |
|---|---|---|---|---|
| 2,100,482 A | * | 11/1937 | Irwine ................. | B01D 33/073 |
| | | | | 210/497.1 |
| 2,137,397 A | * | 11/1938 | Haideman ............ | A01K 63/045 |
| | | | | 261/36.1 |
| 2,275,428 A | * | 3/1942 | Haideman .............. | B01D 35/26 |
| | | | | 261/36.1 |

(Continued)

FOREIGN PATENT DOCUMENTS

| | | |
|---|---|---|
| DE | 19732922 A1 | 4/1998 |
| DE | 202009011484 U1 | 11/2009 |

(Continued)

OTHER PUBLICATIONS

Swedish Office Action and Search Report from Corresponding Swedish Application No. 2150890-8, dated Mar. 1, 2022, 7 pages.

(Continued)

*Primary Examiner* — Robert J Popovics
(74) *Attorney, Agent, or Firm* — Ronald M. Kachmarik; Cooper Legal Group LLC (57) ABSTRACT

A filter device for filtering water. The device includes a housing, for submersion in a water reservoir, that includes an intake aperture for intake of water from the reservoir and a return aperture for returning water to the reservoir. The housing extends along an axis. The device includes a pump, housed in the housing, arranged on the axis to direct fluid from the intake aperture to the return aperture. The device includes a filter arrangement, housed in the housing, arranged along the axis from the pump in a fluid path between the intake aperture and the return aperture.

9 Claims, 6 Drawing Sheets

(56) References Cited

U.S. PATENT DOCUMENTS

| | | | | |
|---|---|---|---|---|
| 2,448,157 A * | 8/1948 | Schneider | B01D 35/26 | 210/167.01 |
| 2,515,538 A * | 7/1950 | Wall | A01K 63/045 | 261/87 |
| 2,641,455 A * | 6/1953 | Poirot | A01K 63/042 | 261/36.1 |
| 3,273,717 A * | 9/1966 | Canterbury | A01K 63/045 | 415/121.2 |
| 3,295,681 A * | 1/1967 | Rubert | A01K 63/045 | 210/197 |
| 3,468,288 A * | 9/1969 | Cassil | A01K 63/065 | 210/283 |
| 3,630,373 A * | 12/1971 | Grazen | F04D 29/2211 | 416/174 |
| 3,662,889 A * | 5/1972 | Takarabe | A01K 63/045 | 210/167.01 |
| 3,687,291 A * | 8/1972 | Willinger | A01K 63/047 | 417/241 |
| 3,722,686 A * | 3/1973 | Arnett | B01D 29/01 | 210/242.1 |
| 3,744,635 A * | 7/1973 | Horvath | F04D 29/2277 | 210/167.25 |
| 3,800,462 A * | 4/1974 | Coyle | A01K 63/042 | 43/57 |
| 3,904,393 A * | 9/1975 | Morse | B01F 25/21 | 55/505 |
| 3,924,570 A * | 12/1975 | Lamonica | A01K 63/045 | 119/261 |
| 4,024,064 A * | 5/1977 | Rakowicz | B01D 35/06 | 210/416.1 |
| 4,077,877 A * | 3/1978 | Orensten | A01K 63/045 | 210/615 |
| 4,166,086 A * | 8/1979 | Wright | A01K 63/042 | 210/219 |
| 4,238,335 A * | 12/1980 | Grimsley | B01D 24/30 | 210/802 |
| 4,255,360 A * | 3/1981 | Jeffries | C02F 3/24 | 415/206 |
| 4,353,846 A * | 10/1982 | Mehrens | B01D 35/26 | 415/121.2 |
| 4,392,953 A * | 7/1983 | Cornelius | A01K 63/045 | 210/453 |
| 4,424,007 A * | 1/1984 | Mehrens | F04B 53/20 | 415/121.2 |
| 4,601,821 A * | 7/1986 | Sherman | A01K 63/045 | 210/493.1 |
| 4,744,897 A * | 5/1988 | Yes | B01D 24/4642 | 210/167.01 |
| 4,749,493 A * | 6/1988 | Hicks | C02F 3/24 | 210/150 |
| 4,802,980 A * | 2/1989 | Gilkey | A01K 63/045 | 210/416.2 |
| 4,810,385 A * | 3/1989 | Hater | C02F 3/348 | 210/615 |
| 4,894,151 A * | 1/1990 | Woltmann | A01K 63/045 | 210/282 |
| 4,936,043 A * | 6/1990 | Steele | A01K 97/05 | 43/57 |
| 4,944,871 A * | 7/1990 | Ogawa | A01K 63/045 | 210/167.25 |
| 4,994,177 A * | 2/1991 | Bogar, Jr. | A01K 97/05 | 210/167.01 |
| 5,011,600 A * | 4/1991 | Mowka, Jr. | A01K 63/045 | 210/167.25 |
| 5,062,951 A * | 11/1991 | Tominaga | A01K 63/045 | 210/416.2 |
| 5,100,543 A * | 3/1992 | Stauffer | A01K 63/045 | 210/287 |
| 5,131,821 A * | 7/1992 | Marioni | A01K 63/047 | 417/423.3 |
| 5,139,659 A * | 8/1992 | Scott | A01K 63/047 | 119/261 |
| 5,160,039 A * | 11/1992 | Colburn | C02F 3/10 | 210/167.01 |
| 5,169,520 A * | 12/1992 | Wang | A01K 63/045 | 210/167.26 |
| 5,213,718 A * | 5/1993 | Burgess | B01F 23/233 | 261/93 |
| 5,275,762 A * | 1/1994 | Burgess | B01F 27/25 | 261/93 |
| 5,282,727 A * | 2/1994 | Willinger | F01N 13/001 | 417/423.15 |
| 5,290,157 A * | 3/1994 | Willinger | A01K 63/047 | 417/423.15 |
| 5,316,670 A * | 5/1994 | Yao | A01K 63/045 | 119/261 |
| 5,318,701 A * | 6/1994 | Wang | A01K 63/045 | 415/121.2 |
| 5,380,160 A * | 1/1995 | Chen | A01K 63/045 | 210/221.1 |
| 5,582,777 A * | 12/1996 | Vento | B01F 23/23342 | 261/93 |
| 5,996,977 A * | 12/1999 | Burgess | B01F 27/25 | 261/93 |
| 6,050,550 A * | 4/2000 | Burgess | B01F 35/21 | 261/29 |
| 6,142,705 A * | 11/2000 | Edwards | E02B 8/06 | 137/143 |
| 6,187,194 B1 * | 2/2001 | Byrne | C02F 3/06 | 210/612 |
| 6,540,804 B1 * | 4/2003 | Wennerstrom | F24F 1/0071 | 55/DIG. 3 |
| 6,582,612 B1 * | 6/2003 | White | A01K 61/60 | 119/239 |
| 6,797,163 B2 * | 9/2004 | Carley | A01K 63/045 | 210/172.2 |
| 6,893,573 B2 * | 5/2005 | Dover | A01K 63/045 | 210/167.01 |
| 6,896,798 B2 * | 5/2005 | Dover | A01K 63/045 | 210/167.01 |
| 6,962,019 B1 * | 11/2005 | McDougle | A01K 63/06 | 210/189 |
| 7,024,814 B1 * | 4/2006 | McDougle | A01K 97/05 | 210/189 |
| 7,220,355 B2 * | 5/2007 | Palmer | B01D 35/26 | 415/121.2 |
| 7,316,775 B2 * | 1/2008 | Carley | A01K 63/045 | 210/220 |
| 7,416,659 B2 * | 8/2008 | Newman | A01K 63/045 | 210/416.2 |
| 8,361,315 B2 * | 1/2013 | Sun | A01K 63/045 | 119/261 |
| 9,497,942 B2 * | 11/2016 | Herman | A01K 63/045 | |
| 9,555,352 B2 * | 1/2017 | Stiles, Jr. | B01D 29/23 | |
| 9,636,617 B2 * | 5/2017 | Wennerström | F04D 29/526 | |
| 9,694,369 B2 * | 7/2017 | Engberg | B03C 3/86 | |
| 9,919,252 B2 * | 3/2018 | Wennerström | F24F 8/108 | |
| 10,167,651 B2 * | 1/2019 | Jackson | E04H 4/1681 | |
| 10,383,315 B2 * | 8/2019 | Lipscomb | A01K 63/047 | |
| 10,787,370 B2 * | 9/2020 | Mainini | C02F 1/4676 | |
| 11,412,719 B2 * | 8/2022 | Lipscomb | A01K 29/00 | |
| 11,766,026 B2 * | 9/2023 | Youn | B01D 29/50 | 119/73 |
| 11,839,202 B2 * | 12/2023 | Youn | B67D 1/0869 | |
| 11,871,732 B2 * | 1/2024 | Yoo | A01K 7/022 | |
| 12,127,538 B2 * | 10/2024 | Youn | B67D 1/0869 | |
| 2004/0060852 A1 * | 4/2004 | Dover | B01D 29/05 | 210/167.14 |
| 2004/0060854 A1 * | 4/2004 | Dover | A01K 63/045 | 210/167.14 |
| 2004/0115078 A1 * | 6/2004 | Chen | F04D 31/00 | 417/424.1 |
| 2006/0113230 A1 * | 6/2006 | Carley | A01K 63/045 | 210/416.2 |
| 2007/0023338 A1 * | 2/2007 | Newman | A01K 63/045 | 210/167.23 |
| 2012/0152866 A1 * | 6/2012 | Stiles, Jr. | B01D 29/23 | 210/416.1 |

(56) References Cited

U.S. PATENT DOCUMENTS

| | | | | |
|---|---|---|---|---|
| 2012/0216751 | A1* | 8/2012 | Rowe | A01K 7/00 |
| | | | | 119/72 |
| 2015/0189862 | A1* | 7/2015 | Lipscomb | B01D 35/26 |
| | | | | 210/232 |
| 2015/0231542 | A1* | 8/2015 | Wennerstrom | F24F 13/28 |
| | | | | 55/356 |
| 2015/0231543 | A1* | 8/2015 | Wennerstrom | F24F 13/28 |
| | | | | 415/203 |
| 2015/0231645 | A1* | 8/2015 | Engberg | B03C 3/368 |
| | | | | 96/88 |
| 2017/0362092 | A1* | 12/2017 | Mainini | C02F 1/66 |
| 2019/0335723 | A1* | 11/2019 | Lipscomb | A01K 7/00 |
| 2023/0012214 | A1* | 1/2023 | Wennerström | B01D 35/153 |
| 2023/0090186 | A1* | 3/2023 | Watts, Jr. | A01K 97/05 |
| | | | | 43/56 |

FOREIGN PATENT DOCUMENTS

| | | | | |
|---|---|---|---|---|
| DE | 102010044732 | A1 | 3/2012 | |
| EP | 4122892 | A1 * | 1/2023 | B01D 29/35 |
| GB | 1560581 | A | 2/1980 | |
| WO | 9749279 | A1 | 12/1997 | |

OTHER PUBLICATIONS

European Search Report from Corresponding European Application No. 22183029.2, dated Jan. 3, 2023, 7 pages.
European Communication from Corresponding European Patent Application No. 22183029.2, dated Jan. 30, 2023, 2 pages.

* cited by examiner

MULTIPASS WATER FILTER

TECHNICAL FIELD

The present invention relates to filters for drinking water. In particular, the present invention relates to portable filter devices for filtering water using multiple passes through a filter.

BACKGROUND

Conventional water filtration systems for drinking water involve passing water through a filter once. Improvements in filtration are therefore dependent on the design of said filter and, thus, highly purified water can be complex and costly to achieve.

Furthermore, typical water filtration systems distinguish between unfiltered water reservoirs and filtered water reservoirs, whereby water is taken from the unfiltered water reservoir and passed through a filter so as to be deposited into the filtered water reservoir.

Common household water filter devices use the gravitational pull of water in an upper reservoir to pull it through a through a filter so as to be deposited into a lower reservoir.

These reservoirs can be particularly configured for integration into such filter devices. That is, the reservoirs form part of the filtration system such that the filter arrangement and/or upper reservoirs can be shaped to complement the shape of the lower reservoir. This can lead to a wasted space in such filter devices, as the upper reservoir is not used for storage of filtered water.

Moreover, although the use of gravity to move water through the filter can simplify the construction of a filter device, such systems are slow and thus cannot provide filtered water on larger scales.

Some filtration systems employ a pump to recirculate filtered water from the filtered water reservoir back into the unfiltered water reservoir so as to further purify the water. Typically, only the water in the filtered water reservoir will be made available for consumption, i.e., drinking. Thus, if the total volume of water is desired for consumption, a user will be required to wait for the water in the unfiltered water reservoir to be passed through the filter and into the filtered water reservoir.

SUMMARY OF THE INVENTION

The present disclosure provides an improved filter device overcoming one or more of the aforementioned problems in existing filter devices for providing drinking water.

According to a first aspect, there is provided a filter device for filtering drinking water, comprising a housing configured for submersion in a water reservoir, comprising an intake aperture arranged for intake of water from the water reservoir and a return aperture arranged for returning water to the water reservoir. The housing extends along an axis. The filter device further comprises a pump, housed in the housing, arranged on the axis to direct fluid from the intake aperture to the return aperture, and a filter arrangement, housed in the housing, arranged along the axis from the pump in a fluid path between the intake aperture and the return aperture.

According to this aspect, there is provided a quick and ergonomic filter device for filtering water that has a simple construction. The filter device does not require particular configuration for integration into a specific reservoir, so it can be easily applied to any water reservoir, such as a household water jug, saucepan, or other such water reservoirs, without modifying the filter device or reservoir for mutual compatibility. The filter device can thusly create drinkable water in a simple manner.

Furthermore, the configuration of the filter device as a multipass filter device allows for the filters used in the filter arrangement to have a lesser degree of separation. For example, if the degree of separation/filtration provided by a particular filter is, for example, 50% of contaminants on average, then it would not likely be considered for use in the aforementioned single-pass filter devices. However, using the presently described multipass filter device, two passes through such a filter would lead to 75% of contaminants removed, then 87.5% after three passes, 93.75% after four passes, and so on. Hence, smaller and/or inexpensive filters may be used, thus further improving the compactness of the filter arrangement and simplifying its construction.

The housing may be formed of a rigid material with mechanical longevity, so that a first end of the housing may be used for manipulating the filter device (e.g. lifted into a reservoir, removed therefrom, moved therein, directed, etc.). The shape of the housing may take any form that extends along an axis, such as a cylinder or a prism, such that the length of the housing is defined along the axis. Although some examples may have constant cross-sectional profile, the cross-section of the housing may instead vary along at least some of the length the housing. For example, the housing may taper toward the first end so that a user may more easily grip the first end of the housing. Additionally or alternatively, the housing may be provided with a handle for ease of manipulating the filter device.

In some examples, the housing may be spherical, spheroidal, or ellipsoidal, e.g. extending along a diameter, semi-major axis, or semi-minor axis.

The intake aperture may be one or more apertures (openings, through-holes, perforations, etc.) that allow for a flow of water therethrough, i.e. from an outside of the housing to an inside of the housing. The intake aperture(s) may take any shape but may preferably be large enough to allow for the pump to operate at full power without being limited by viscous behaviour at the intake aperture. However, the intake aperture may also be advantageously small enough and/or shaped so as to advantageously create a directional flow through the intake aperture. For example, a substantially smooth-edged circular aperture having a suitable diameter may create a jet-like flow therethrough. Thus, an intake aperture may be arranged and shaped in such a way as to assist in directing water towards the filter arrangement for filtration.

The housing may further comprise one or more spacers extending from a second end, the second end being opposed to the first end, wherein the one or more spacers are configured for spacing the intake aperture from a surface of a water reservoir whilst allowing a passage of water into the intake aperture. The spacers may take any form that provides a spacing between the housing and a surface of a water reservoir. For example, if the intake aperture were disposed on a bottom surface of the filter device, the placement of the filter device vertically onto a flat bottom surface of a water reservoir may cause the intake aperture to be obstructed, thus limiting the water flow into the filter device. Thus, the spacers may allow for an increased water flow into the intake aperture of the housing. In some examples, the spacers may be arranged so as to have a direction and/or low-drag profile for water flowing towards the intake aperture. For example, the spaces may take the form of fins, splines, ridges, or similar that are radially arranged around the intake aperture so as to direct water towards the intake aperture.

The return aperture may similarly be one or more apertures (openings, through-holes, perforations, etc.) that allows for a flow of water therethrough, i.e. from an inside of the housing to an outside (e.g. returning water back into a water reservoir). The return aperture(s) may take any shape but may preferably be large enough not to excessively impede the flow of water. The return aperture(s) may be shaped or sized so as to encourage recirculation in a water reservoir. Additionally or alternatively, the return aperture(s) may be shaped or sized to maximise a surface of the filter arrangement that is proximate to a return aperture, thus helping to ensure that filtered water is not unnecessarily retained in the filter device.

The housing may further comprise an access aperture for allowing access to internal components of the filter device (e.g. the pump and/or the filter arrangement). The access aperture may be at the first end or the second end of the filter device, or somewhere in between, for example taking the form of a side panel or an entire side wall.

The access aperture is removably sealed by a sealing element which selectively allows access to the access aperture. The sealing element may form an entirely waterproof seal or may have the intake aperture and/or return aperture arranged therein. In use, a user may remove the sealing element to open the access aperture and access internal components so that the internal components may be maintained or replaced.

The filter device may further comprise a sub-housing housed in the housing for containing liquid-sensitive components. Liquid-sensitive components may include electronics, liquid-soluble components and/or other components that are sensitive to liquid.

The sub-housing may preferably be openable for access to components stored therein. In such cases, the sub-housing may be sealable closed by a waterproof seal. For example, a part of the sub-housing may be comprised of the sealing element such that the sealing of the housing by the sealing element also seals the sub-housing. Alternatively, the sealing element may comprise the sub-housing as part of it. For example, the sub-housing may take the form of a plug, conforming to the size and shape of the access aperture, such that placement of the sub-housing into the access aperture removeable seals the access aperture. When removing the sub-housing from the access aperture, the opening may then be on a side of the sub-housing that was spaced towards an inside of the housing such that the outer-facing portion of the sub-housing forms the sealing element for the housing and can be formed without seams, thus improving the waterproof seal.

The pump may be an electric pump or a mechanically powered pump. For example, the pump may comprise an electric motor and an impeller driven by the electric motor.

In some examples, the electric motor may be arranged spaced along the axis of the housing from the impeller. The electric motor may be powered by a battery housed inside or outside the housing, or by a mains connection. In some examples, the filter may further comprise a power cable for communicating power from outside the housing to internal electronic components of the filter device.

Alternatively, the pump may comprise an impeller (or propeller) mechanically engaging a gearing assembly that is driven through actuation of the filter device, e.g. against a surface of a water reservoir. That is, in some examples, the second end of the filter device may comprise a driving screw and actuation of the filter device may cause the driving screw to rotate and, via the gearing assembly, drive the impeller of the pump. A biasing means such as a spring may be provided to return the driving screw to its original extended position. Such a mechanical arrangement may advantageously reduce the electricity required to operate the filter device.

The pump may be shaped similarly as the housing, thus optimising the utilisation of space within the housing and allowing for a more compact device. For example, one or both of the motor and the impeller may be shaped so as to have a similar cross-section to the housing; e.g., if the housing were cylindrical, the motor and/or the impeller may be shaped so as to also be substantially cylindrical. Furthermore, the pump may be arranged concentrically with the shape of the housing.

Similarly, the filter arrangement may be shaped similarly as the housing, e.g. a cylindrical filter arrangement arranged concentrically with a cylindrical housing. The pump and/or the housing may alternatively be shaped as a prism, extending along an axis.

The pump may comprise an intake and an outlet, wherein the pump is configured to take water in at its inlet and eject water from its outlet. The inlet may be arranged proximate to the intake aperture such that water is drawn directly into the inlet of the pump from the intake aperture. Alternatively, the pump inlet may be arranged remote from the intake aperture, for example at an opposite end thereto. In this latter arrangement, it is still possible for the pump to generate a flow such that fluid is directed from the intake aperture to the return aperture.

The intake and/or outlet of the pump may be configured such that the pump directs fluid along the axis. The return aperture may then advantageously be arranged perpendicular to the axis such that, for example, water exiting the return aperture can encourage greater circulation in the water reservoir.

The filter arrangement may enclose a space that is in fluid communication with the outlet of the pump, so that the pump directs water into said enclosed space. Water within the enclosed space may then be filtered through the filter arrangement before it can exit through the return aperture. In this way, it may be better ensured that more water passes through the filter arrangement as it is circulated through the multipass filter device.

The filter arrangement may comprise one filter or a plurality of different filters, for example, each having different filtration characteristics. Examples of filters include paper filters, adsorption filters such as activated carbon filters, ion exchangers (for improving the hardness qualities of water), amongst others. In some examples, the filter arrangement comprises a UV light source arranged to direct UV light towards water in the fluid path. The use of such a UV light has the further advantage that bacteria and other organic contaminants in the water may be destroyed. In other words, any filter for providing drinkable water may be used in the filter arrangement.

The filter device may further comprise a backflow prevention valve configured to prevent a backflow of water out from the intake aperture. The backflow prevention valve may, for example, be fitted as part of the housing or the pump, and may enforce a unidirectional flow of water through the filter device. Thus, it is possible to prevent water from flowing in an opposite direction to that intended, e.g. from the return aperture to the intake aperture, or an 'incorrect' progression through the filter arrangement, hence preventing sediment or other impurities from being returned into the water reservoir.

BRIEF DESCRIPTION OF THE DRAWINGS

One or more embodiments will be described, by way of example only, and with reference to the following figures, in which.

Whilst the invention is susceptible to various modifications and alternative forms, specific embodiments are shown by way of example in the drawings as herein described in detail. It should be understood, however, that the detailed description herein and the drawings attached hereto are not intended to limit the invention to the particular form disclosed. Rather, the intention is to cover all modifications, equivalents, and alternatives falling within the scope of the appended claims.

For example, although 'water' has been referred to throughout the application, it will be appreciated that any suitable drinking liquid in need of filtration could be substituted without departing from the scope of the appended claims.

Any reference to prior art documents or comparative examples in this specification is not to be considered as an admission that such prior art is widely known or forms part of the common general knowledge in the field.

As used in this specification, the words "comprise", "comprising", and similar words are not to be interpreted in the exclusive or exhaustive sense. In other words, they are intended to mean "including, but not limited to".

DETAILED DESCRIPTION

The present invention is described in the following by way of a number of illustrative examples. It will be appreciated that these examples are provided for illustration and explanation only and are not intended to be limiting on the scope of the present invention. Instead, the scope of the present invention is to be defined by the appended claims. Furthermore, although the examples may be presented in the form of individual embodiments, it will be recognised that the invention also covers combinations of the embodiments described herein.

Figure 1:
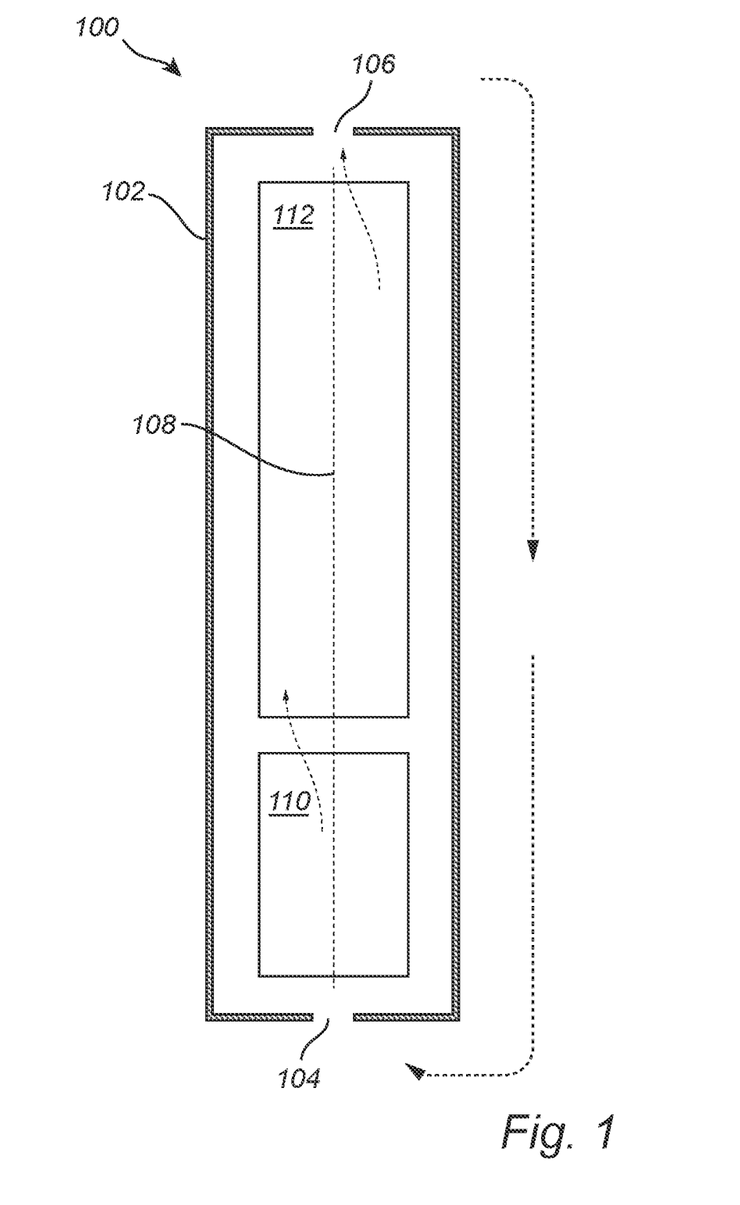
FIG. 1 schematically shows a filter device according to an embodiment.

FIG. 1 schematically shows a filter device 100, according to an embodiment.

In the illustrated embodiment, the filter device 100 has a housing 102 configured for submersion in a water reservoir. The water reservoir may hold water that in some way is contaminated, i.e., in need of filtration before drinking. The housing 102 may be any water resistant or waterproof material having suitable rigidity so as to hold its shape when submerged in a water reservoir. For example, the housing 102 may be made of plastic, non-corroding metal such as stainless steel, silicon rubber, or the like.

The housing 102 has an intake aperture 104 and a return aperture 106. In the illustrated embodiment, these are arranged at opposing ends of the housing 102, although they may be arranged in any suitable position that allows for a placement of a filter arrangement 112 in a fluid path there between.

Housed in the housing, there is a pump 110 and a filter arrangement 112. The pump 110 may be an electric or mechanically powered pump and is arranged to direct fluid from the intake aperture 104 to the return aperture 106. Although the pump 110 is illustrated as being in the fluid path between the intake aperture 104 and the return aperture 106 (the fluid path being shown as dotted arrows), it may also be arranged in any suitable position in or away from the fluid path where the pump has sufficient fluid communication with the intake aperture 104 and/or return aperture 106 to promote the flow of fluid therethrough.

The filter arrangement 112 may be formed of one or more filters and/or, for example, a UV light. The filter arrangement 112 is arranged in the fluid path between the intake aperture 104 and the return aperture 106 so as to remove contaminants (particulates, bacteria, sediment, etc.) from the water passing therethrough for creating drinkable water.

It may be preferable to prioritise fluid flow through the filter arrangement 112 over superior filtration characteristics of the filter arrangement 112, so as to allow for improved circulation of water through the water reservoir and increase the rate at which multiple passes through the filter arrangement may be achieved.

The housing 102 is extended along an axis 108, shown as a dotted line. Thus, the filter device 100 has an ergonomic configuration such that a user may easily place the filter device 100 into a water reservoir, remove it therefrom, and/or direct it therein. For example, a user may wish to move the filter device 100 around in the water reservoir so as to target particular areas where sediment may be visible, or simply to expedite the circulation of most/all of the water through the filter device 100. By allowing this, the filter device 100 can more swiftly filter the water and ensure that it is in a drinkable condition.

The pump 110 and the 112 are arranged along the axis 108. Thus, the extended shape of the housing 102 (delimiting the overall shape of the filter device 100) may remain compact and ergonomic.

As illustrated in FIG. 1, there may be one or more fluid paths from the intake aperture 104 to the return aperture 106 that do not pass through the filter arrangement 112. This may be preferable so as to encourage greater circulation through the water reservoir (i.e. without slowing/impeding fluid flow by forcing it through the filter arrangement 112), which may allow for a faster filtration of all of the water in the water reservoir using multiple passes.

The pump 110 and the filter arrangement 112 as shown in FIG. 1 are arranged centrally in the housing 102. However, their placement may instead be more towards one side than another, if particular fluid flows are desired or if any other mechanical constraints exist when arranging the internal components inside the housing 102.

Figure 2:
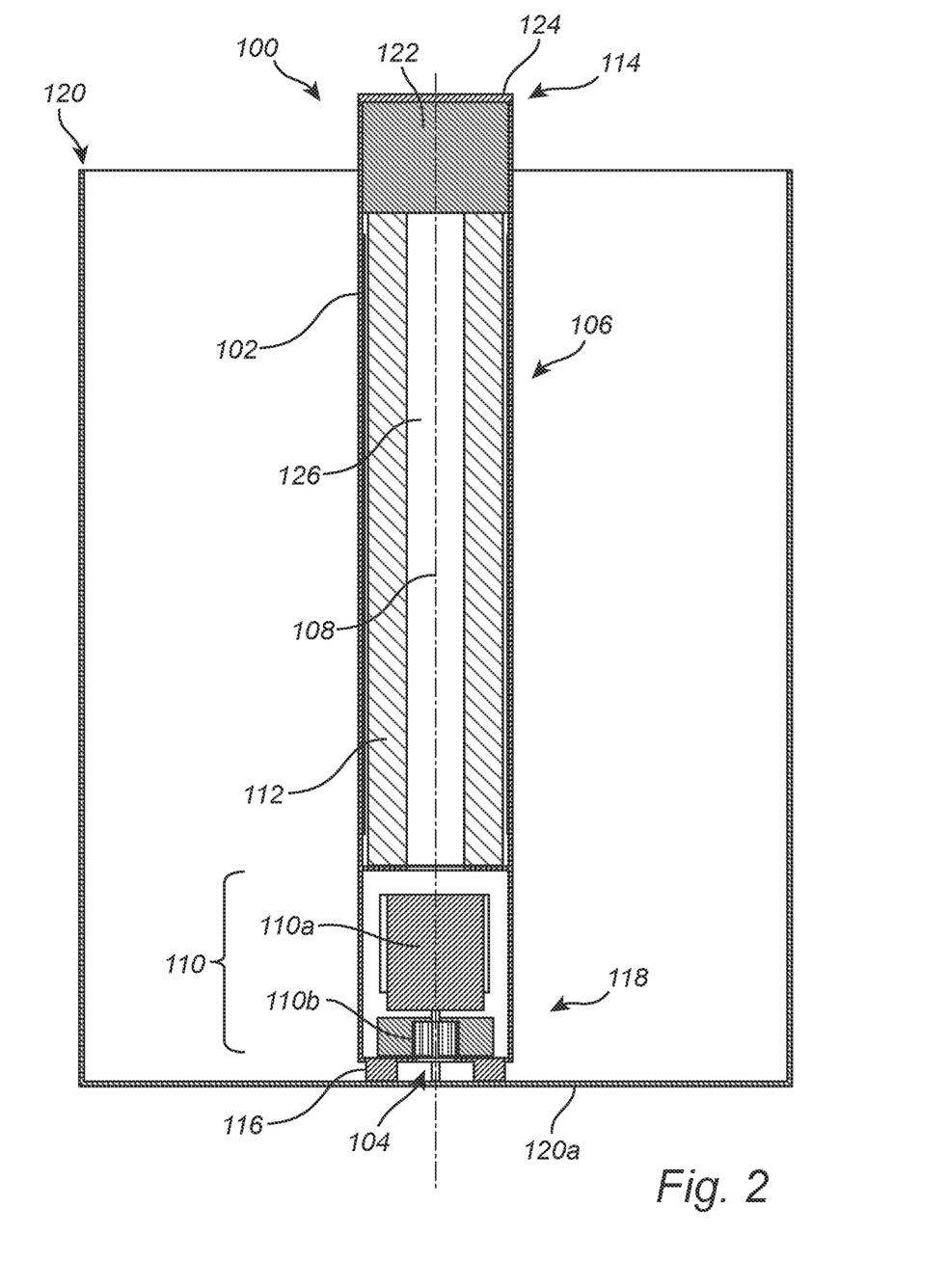
FIG. 2 shows a cross-section of a filter device in a water reservoir, according to an embodiment.

FIG. 2 shows a cross-section of a filter device 100 in a water reservoir 120, according to an embodiment. Components having reference numerals that are also used in FIG. 1 may be the same or similar components as those with corresponding reference numerals in FIG. 1.

The filter device 100 shown in FIG. 2 has an intake aperture arranged at the bottom of the filter device (as illustrated), as with FIG. 1, however the return aperture in the filter device 100 shown in FIG. 2 is arranged at a side of the filter device 100, i.e. perpendicular to the axis 108.

The pump 110 is formed of two sub-components: an electric motor 110a and an impeller 110b arranged proximate to the intake aperture 104. The electric motor 110a may be battery powered or mains powered. If the electric motor 110a is mains powered, for example, the filter device 100 may further comprise power connection cables extending through the housing 102 (e.g. through the access aperture or some other opening) for connecting the electric motor 110a to a mains power supply.

When operated, the impeller 110b draws water through the intake aperture 104 and into the housing 102. The portion of the housing 102 that houses the pump 110 is connected to the portion that houses the filter arrangement 112 in such a way that the outlet of the impeller 110b is in fluid communication with the filter arrangement 112.

In particular, the filter arrangement 112 can be seen in FIG. 2 as enclosing a space 126 and the outlet of the impeller 110b is in fluid communication with this space 126. Thus, water cannot escape the space 126 through the return aperture 106 without passing through the filter arrangement 112. In the illustrated embodiment, the space 126 is formed as a central core of the filter arrangement 112 however, other arrangements are possible.

The filter device 100 has a first end (indicated generally as 114) and a second end (indicated generally as 118) being opposed along the axis 108.

The first end 114 may be configured for manipulation by a user. That is, in the illustrated example, the filter device 100 is shown as being in a water reservoir 120, for example a jug of water (water not shown). It can be seen that the first end 114 is appropriately proportioned for a hand of a user to ergonomically grasp such that the filter device 100 may be moved within the water reservoir 120 or removed therefrom. In some examples, the first end 114 may further comprise a handle for further ease of manipulation by a user. As stated, the water reservoir 120 may for example be a jug of water in need of purification prior to being drinkable. By allowing the filter device 100 to be placed in the water it may be filtered and made drinkable. And by allowing the user to manipulate the filter device 100 this process can be accelerated.

The second end 118 may be configured to be spaced from a surface of the water reservoir 120 (e.g. the bottom surface 120a, as in FIG. 2). In the illustrated example, this spacing is achieved by one or more spacers 116 which space the intake aperture 104 from the bottom surface 120a of the water reservoir 120, thus allowing a flow of water to the intake aperture 104. The spacers 116 are advantageous in that the filter device 100 does not need to be fastened to, for example, a wall of the water reservoir 120 but can be placed anywhere within the water reservoir 120 and still allow for a flow of water to the intake aperture 104.

The filter device 100 further comprises a sub-housing 122 housed in the housing 102. In the illustrated example, the sub-housing 122 is arranged at the first end 114 of the filter device 100 and is sealed by a sealing element 124.

The sub-housing 122 may be completely or substantially waterproof so as to be configured for containing liquid-sensitive components (not shown). Liquid-sensitive components may be electronics, soluble components, or other components that are not well suited for submersion in water (or other liquids). In the illustrated example, the sub-housing 122 is removeably sealed by a sealing element 124, taking the form of a lid (cap, topper, etc.). The sealing element 124 may be attached with a threaded attachment, a push-in attachments, a bayonet attachment, or some other means that allows for the creation of a substantially waterproof seal.

As shown in FIG. 2, the sealing element 124 also seals the housing 102 at the first end 114. If the sealing element 124 were removed, the housing 102 would have its access aperture (blocked in this view) opened for access to the internal components, such as the sub-housing 122 (including the liquid-sensitive components contained therein), the filter arrangement 112, and/or the pump 110.

In some alternative arrangements, the sub-housing 122 may have an openable sealing on its other end (i.e. towards the second end 118) and the sub-housing 122 may take the form of a plug, conforming to the size and shape of the access aperture of the housing 102 such that, when the sub-housing 122 is pushed into the access aperture at the first end 114, the sub-housing 122 seals the housing 102 in a substantially waterproof manner.

It will be appreciated that, if the first end 114 of the filter device 100 is not intended to be fully submersed in water, the sub-housing 122 and/or the sealing element 124 may not necessarily be required to be entirely waterproof.

Figure 3:
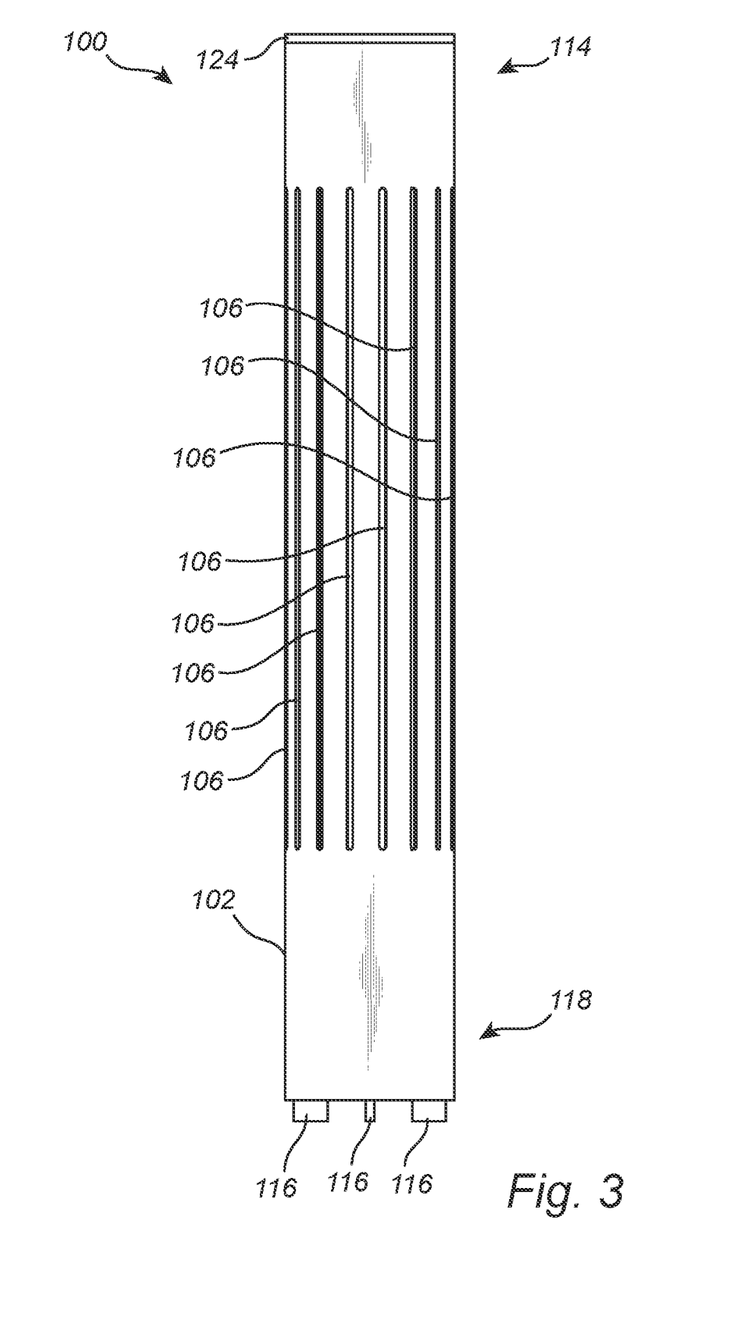
FIG. 3 shows a side view of a filter device, according to an embodiment.

FIG. 3 shows a side view of a filter device 100, according to an embodiment. The internal components such as the pump 110 and the filter arrangement 112 are not visible in this view.

The illustrated housing 102 is cylindrical in shape, having a circular sealing element 124 arranged to seal the housing 102 at the first end 114, and a plurality of spacers 116 arranged at the second end 118 for spacing the filter device 100 from a surface of a water reservoir (as discussed above).

As shown in FIG. 3, the return apertures 106 of the housing 102, according to the illustrated example, extend across a length of the housing 102 and are arranged perpendicular to the axis 108 of housing 102. The return apertures 106 are evenly arranged around a circumference of the cylindrical housing 102 so as to provide a large area for returning water into the water reservoir. The return apertures 106 may have a grid or mesh thereacross so as to prevent an entry of debris, contaminants, etc. from the water reservoir.

The housing 102, spacers 116, and sealing element may be formed from a same material (e.g. plastic, stainless steel, silicon rubber, or the like) or different materials.

Figure 4:
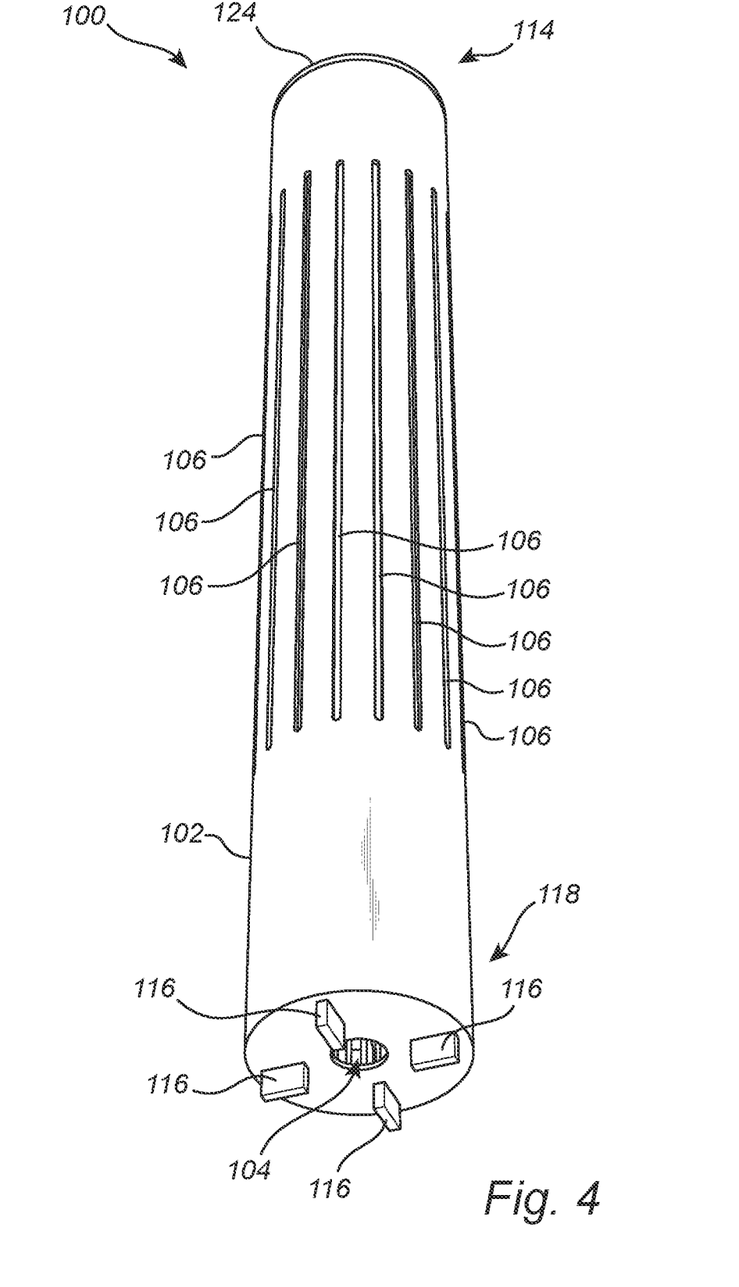
FIG. 4 shows a perspective view of a filter device according to an embodiment, tilted to show an end surface.

FIG. 4 shows a perspective view of a filter device 100 according to an embodiment, tilted to show an end surface of the second end 118. Elements having like reference numerals as in FIG. 3 may be the same or similar to those discussed in FIG. 3.

The intake aperture 104 and the spacers 116 are more clearly shown in the view of FIG. 4. In the illustrated example, there are four spacers 116 taking the form of fins protruding from the circular lower surface of the cylindrical housing 102 and extending along a radial direction.

The spacers 116 preferably have a substantially even or flat construction on their lower side, so as to allow for the filter device 100 to be stable when placed on a bottom surface of a water reservoir. To this end, the spacers 116 may preferably extend in a radial direction enough to collectively provide a stable surface. The present design is advantageous since it allows the filter device 100 to be placed in a water reservoir for filtering and purifying water to create drinkable water. In other words, the filter device 100 does not need to be fastened in any way and can thusly be used easily in any type of water reservoir for filtering the water and ensuring that it is drinkable.

Furthermore, the spacers 116 preferably have a low-drag profile viewed from the intake aperture 104 and may be arranged for directing water towards the intake aperture 104. Thus, water being drawn in by the pump 110 (e.g. by an impeller such as the impeller 110a shown in FIG. 2) does not excessively drag against the spacers 116, which may cause the filter device 100 to move or tip over in the water reservoir.

Although only four spacers 116 are shown, it will be appreciated that there may be more or fewer spacers 116, and these may have a different shape or configuration, although the aforementioned considerations of stability and fluid drag profile may still apply.

The intake aperture 104 is shown as being a circular aperture concentrically arranged at a centre of the circular lower face of the cylindrical housing 102. The spacers 116 are arranged at a radius beyond the intake aperture 104, although in some examples these may radially overlap (e.g. the spacers 116 may form a cross shape across the intake aperture 104). It will also be appreciated that the intake aperture 104 may take any shape that is suitable for allowing sufficient fluid flow therethrough.

The intake aperture 104 may have a backflow prevention valve (not shown) arranged proximate thereto, for example immediately at its entry. The backflow prevention valve may ensure that water flowing in through the intake aperture 104 cannot flow back out, for example if the pump 110 is turned off, or if there is a malfunction. Thus, it is possible to prevent contaminants that have been filtered out from the water from being returned to the water reservoir. The intake aperture 104 may further comprise a mesh, screen, or grid arranged thereacross for preventing solids of a particular size from entering the filter device 100 and potentially damaging the internal components.

Figure 5:
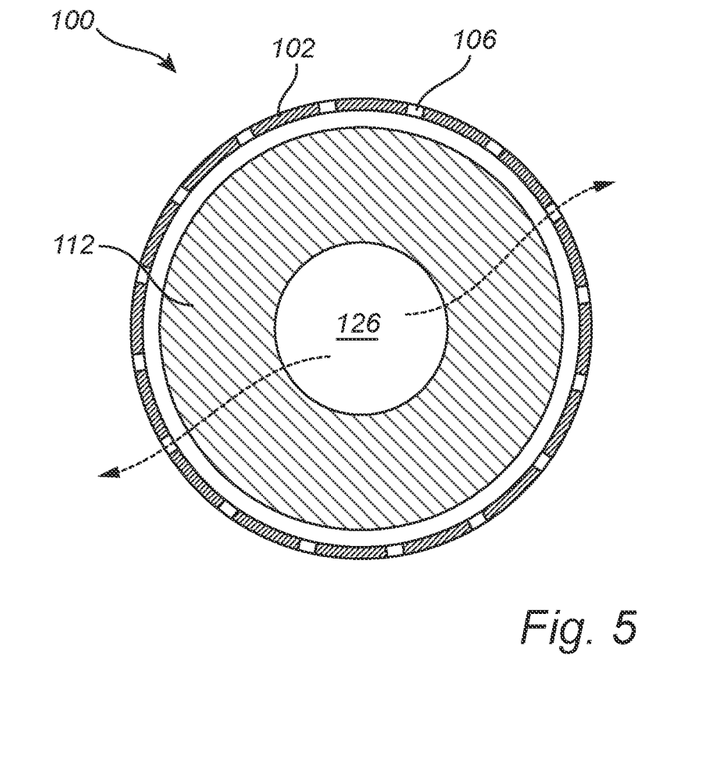
FIG. 5 shows a cross-section through a filter device according to an embodiment.

FIG. 5 shows a cross-section through a filter device 100 according to an embodiment.

As with the filter devices 100 shown in FIGS. 3 and 4, the illustrated example has a circular cross-section. However, the housing 102 (and/or pump 110, filter arrangement 112, or other internal components) may instead have a different cross-section, such as a triangular or rectangular cross-section.

The cylindrical housing 102 has a plurality of return apertures 106 extending through the thickness of the housing 102 and arranged evenly around its circumferences. In some examples, the return apertures 106 may be unevenly distributed about a perimeter of the housing 102, for example directionally distributed so as to encourage circulation in a water reservoir in a particular direction.

As shown in FIG. 5, the filter arrangement 112 has a circular cross section and is arranged concentrically with the housing 102. The filter arrangement 112 is shown having a homogeneous construction, although the filter arrangement 112 may instead have a plurality of layers therein, such as a sequence of different filters having different filter characteristics. For example, an innermost layer may be a coarse sponge filter, whilst an outermost layer may be a fine activated carbon filter. The filter arrangement 112 is configured to enclose a space 126, which is shown as a concentric circle at a radial centre of the cross-section. Water may be directed, by the pump 110, into this space 126, wherefrom it flows through the filter arrangement 112 and out through the return apertures 106, as indicated by the dotted arrows.

In the illustrated example, there is a further space between the filter arrangement 112 and the return apertures 106. Such an arrangement may advantageously allow for a distribution of fluid flow evenly through the return apertures 106. Thus, if a particular circumferential portion of the filter arrangement 112 has a slower flow therethrough than another portion (e.g. as a result of sediment build-up or clogging), a similarly circumferentially arranged return aperture 106 may not experience a decrease in fluid flow, thus helping to maintain a circulation rate of fluid in the water reservoir.

The filter arrangement 112 may further comprise a UV light source configured to direct UV light onto fluid in the fluid path between the intake aperture 104 and the return aperture 106. For example, the UV light may be arranged in the space 126 or in a space between the filter arrangement 112 and the return apertures 106. In some examples, the UV light source may be arranged proximate to the intake aperture 104. The UV light source may preferably be arranged nearby the electric motor 110a, if such a motor is included, such that the electrical power circuitry in the filter device 100 is simplified.

Figure 6:
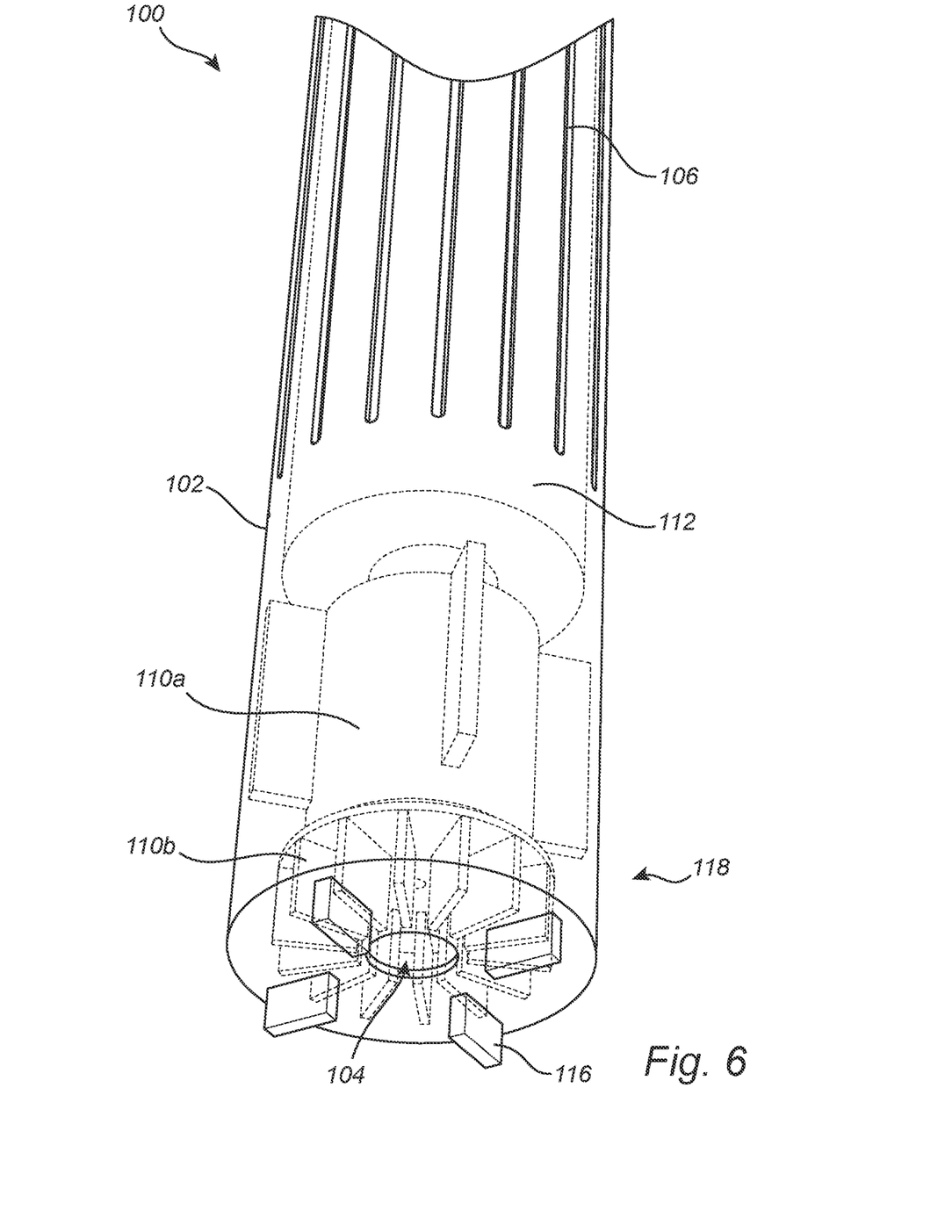
FIG. 6 shows a perspective view of a portion of a filter device, according to an embodiment, with the housing made transparent to show internal components of the filter device.

FIG. 6 shows a perspective view of a portion of a filter device 100, according to an embodiment, with the housing 102 made transparent to show internal components of the filter device 100. Elements having similar reference numerals as in previous figures may be the same or similar to such previously discussed elements.

As shown in the illustrated example, the filter arrangement 112 is cylindrical in shape so as to conform to the inside of the cylindrical housing 102 and efficiently occupy the volume thereof. The motor 110a of the pump 110 is also substantially cylindrical, which allows for its arrangement along the axis between the filter arrangement 112 and the impeller 110b which directs water towards the return apertures 106, and into a space (not shown) enclosed by the filter arrangement 112.

The motor 110a is provided with fins on its radially outer surface, extending along the axis 108 of the housing 102 so as to allow for water passing the motor 110a to be directed along the axis 108. This may further increase the flow through the filter device 100 and further improve circulation in the water reservoir.

Thus, as described above, there is provided a filter device 100 for filtering drinking water. The filter device 100 comprises a housing 102 configured for submersion in a water reservoir 120, comprising an intake aperture 104 arranged for intake of water from the water reservoir 120 and a return aperture 106 arranged for returning water to the water reservoir 120. The housing 102 extends along an axis 108. The filter device 100 further comprises a pump 110, housed in the housing 102, arranged on the axis 108 to direct fluid from the intake aperture 104 to the return aperture 106. The filter device 100 further comprises a filter arrangement 112, housed in the housing 102, arranged along the axis from the pump in a fluid path between the intake aperture and the return aperture.

According to one or more of the forgoing embodiments, the filter device 100 is a multipass filter device 100 configured for encouraging circulation in a water reservoir 120 such that water passes multiple times through the filter arrangement 112. Therefore, smaller or more inexpensive filters may be used in the filter arrangement 112. The general idea of the invention is to provide an easily used filter device 100 for purifying water. In order to create drinkable water the filter device 100 is simply placed in any water reservoir 120.

Furthermore, the filter device 100 may be ergonomically formed so as to have a housing extending along an axis 108 and to have its internal components arranged along said axis 108. Thus, the filter device 100 may be placed into a water reservoir 120 without needing to be specially configured to mutual compatibility therewith. According to this arrangement, a maximum availability of water in the water reservoir 120 is available at all times during a filtration process because water is not separately stored in 'filtered' and 'unfiltered' reservoirs.

Although specific example embodiments have been described with respect to the figures, it is considered that this discussion is not limiting upon the scope of the invention, which is instead defined by the scope of the following claims.

The invention claimed is:

1. A submersible filter device for filtration of water in a reservoir comprising:
   an elongate housing (102) defining an interior volume, the elongate housing (102) including:
      an intake aperture (104) extending through a bottom surface of the elongate housing (102) permitting ingress of water into the elongate housing (102);
      a plurality of elongate slits (106) extending along the length of the elongate housing (102) permitting egress of water from the elongate housing (102);
   a pump (110) disposed within a lower portion of the interior volume, the pump having an electric motor (110a) and an impeller (110b) arranged proximate to the intake aperture (104);
   a filter arrangement (112) disposed within the interior volume above the pump (110);
   a waterproof sub-housing (122) disposed within in the elongate housing (102) above the filter arrangement (112); and
   at least one spacer (116) extending from the bottom surface of the elongate housing (102) for keeping the intake aperture (104) spaced from a bottom surface (120a) of the water reservoir (120), to permit water to be filtered to enter the intake aperture (104).

2. The submersible filter device of claim 1, wherein the elongate housing is substantially shaped as a cylinder or prism.

3. The submersible filter device of claim 2, wherein at least one of the pump and the filter arrangement is substantially shaped as a cylinder or prism, and arranged concentrically with the shape of the housing.

4. The submersible filter device of claim 1, wherein the elongate housing further comprises an access aperture, for allowing access to internal components of the filter device.

5. The submersible filter device of claim 1, wherein the filter arrangement encloses a space in fluid communication with an outlet of the pump.

6. The submersible filter device of claim 1, wherein the filter arrangement comprises a plurality of filters, wherein at least one filter of the plurality of filters has different filtration characteristics than another filter of the plurality of filters.

7. The submersible filter device of claim 1, wherein the filter arrangement comprises a UV light source arranged to direct UV light towards water passing through the elongate housing.

8. The submersible filter device of claim 1, further comprising: a backflow prevention valve operable to prevent a backflow of water out from the intake aperture.

9. A system comprising:
   a water reservoir; and
   the filter device according to claim 1, wherein, the intake aperture and the elongate slits are in fluid communication with the water reservoir, and during operation of the pump, water from the reservoir flows into the intake aperture, through the filter arrangement, and out through the slits, back into the reservoir.

* * * * *